Dec. 13, 1960  W. G. J. HECKMANN  2,964,193
CENTRIFUGE FOR SEPARATING WATER FROM
FINE GRANULAR MATERIAL
Filed Aug. 2, 1957  2 Sheets-Sheet 2
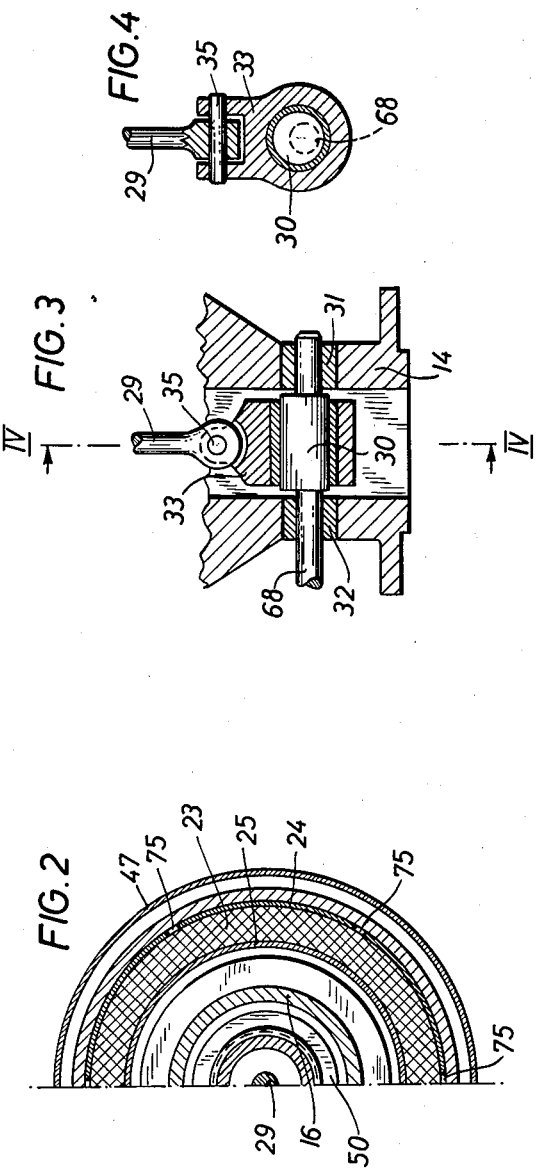
INVENTOR.
Wolfgang Gertrud
BY Joseph Heckmann

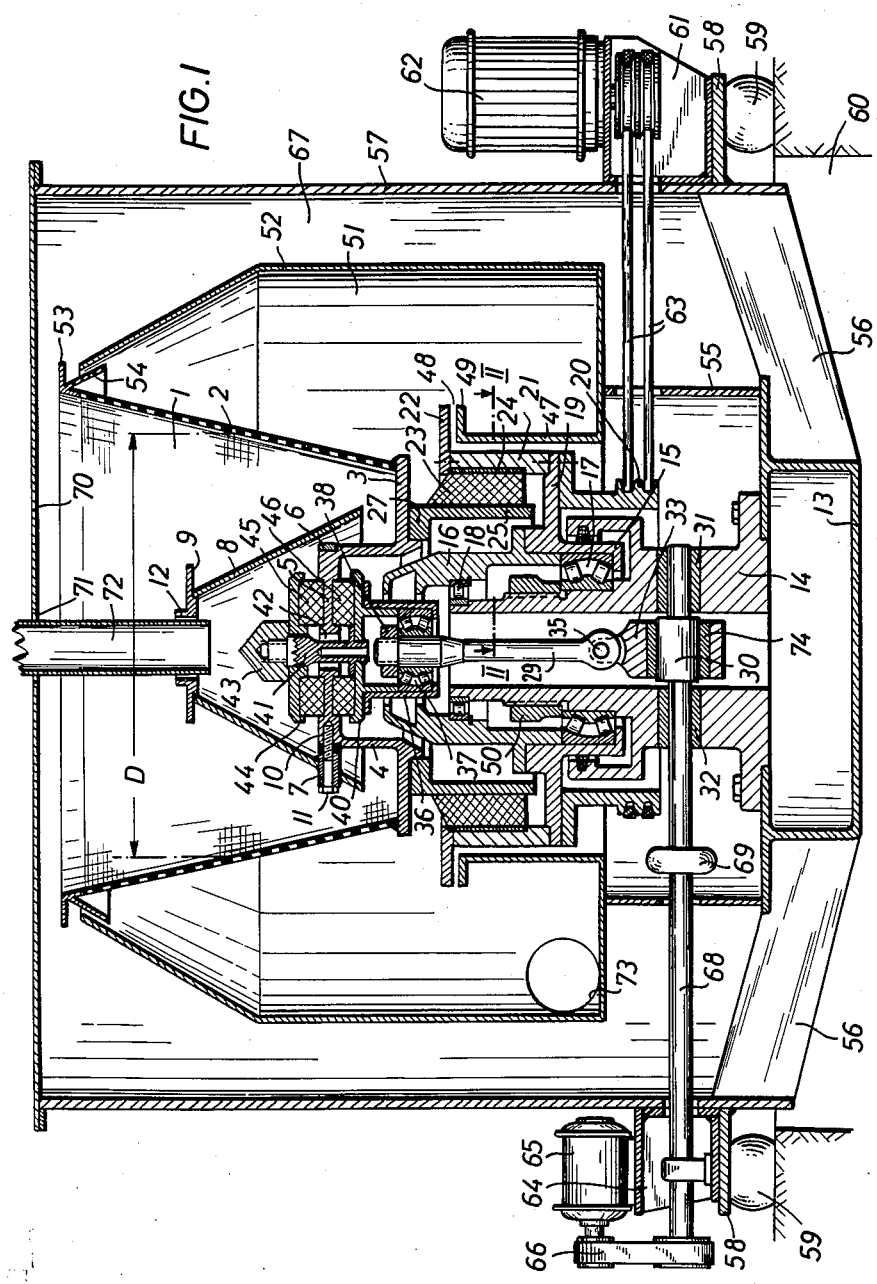

United States Patent Office 2,964,193
Patented Dec. 13, 1960

2,964,193

CENTRIFUGE FOR SEPARATING WATER FROM FINE GRANULAR MATERIAL

Wolfgang Gertrud Joseph Heckmann, Koln-Deutz, Germany, assignor to Klöckner-Humboldt-Deutz Aktiengesellschaft, Koln-Deutz, Germany Filed Aug. 2, 1957, Ser. No. 675,914

Claims priority, application Germany Sept. 7, 1956

6 Claims. (Cl. 210—370)

This invention relates to a centrifuge, commonly known as an oscillating centrifuge, for separating the water from fine granular material by means of a revolving screening drum which is simultaneously axially oscillated for discharging the separated material.

Oscillating centrifuges are generally constructed with a screening drum resiliently mounted on a rotating drum shaft. In this construction the base plate of the screening drum is annularly shaped and constrained between concentrically arranged oscillating springs of which the outer ends are in engagement with a collar or ring mounted on the drum shaft.

It is an object of the present invention to provide an oscillating centrifuge wherein the screening drum is resiliently mounted on a drum shaft in a manner such that the resultant structure is of a minimum height and a small overall diameter.

This is accomplished by the present invention by arranging concentric with the drum shaft an annularly shaped rubber spring having vulcanized on its inner and outer peripheries at least one metal plate or a plurality of annularly shaped rubber springs having vulcanized on their inner and outer peripheries at least one metal plate and that one side of the spring or springs is fastened by means of its associated metal plate to the drum shaft and the metal plate on the other side of the spring is fastened to the screening drum. An oscillating centrifuge embodying those structural features results in a simplified and economical structure.

In the drawings:

Fig. 1 is a cross sectional view of an oscillating centrifuge constructed in accordance with the present invention.

Fig. 2 is a view taken substantially along the line II—II of Fig. 1.

Fig. 3 is an enlarged view showing the eccentric arrangement for oscillating the centrifuge.

Fig. 4 is a view taken substantially along the line IV—IV of Fig. 3.

The oscillating centrifuge comprises an open top truncated cone screening drum 1 having a screening surface 2 and a base plate 3. The screening surface 2 is generated with a generatrix inclined at approximately 10° to the axis of the drum 1 and the mean diameter D of the drum is approximately 400 mm. The base plate 3 is annularly shaped and on its inner periphery is formed with a cylindrical sleeve 4 encircling the drum shaft and the upper end of the sleeve 4 carries an inwardly disposed flange 5 having a central opening 42. On the upper end of the outer periphery of the sleeve 4 there is seated a narrow ring 6 on which there are fastened three or more equally spaced tube members 7 of which the outer ends extend through and are fastened to, as by welding, a hollow truncated cone 8 having a cover 9 in which there is formed a central opening 12. Provided on the cylindrical ring 4 are threaded openings 10 spaced complementary to the tube members 7, such that studs 11 received by the tube members 7 may be threaded therein. In this manner the truncated cone 8 is held centrally positioned and spaced from the base plate 3 of the screening drum 1.

On the machine base there is secured a stationary hollow center post 14 which is encircled by a hollow drum shaft comprising two hollow coaxial members 15 and 16 fastened together by screws or the like. Substantially centrally of the drum shaft 15 and 16 there is a pendulum roller bearing 17 which receives axial and radial loads and adjacent the upper end is guiding roller bearing 18. For holding the pendulum roller bearing 17 positioned on the drum shaft there is provided a nut 50. The drum shaft member 15 is formed with a collar 19 on which there is secured a pulley 20 and the upper outer periphery of the collar 19 carries a ring 21 arranged coaxially with the drum shaft.

Arranged on the ring 21 is an annular rubber spring member comprising a rubber body 23 having vulcanized on its inner and outer peripheries respectively a metal shell 24 and 25. The outer shell 24 is retained in the ring 21 by the inwardly extending edge of an annular plate 22 which is fastened to the upper edge of the ring 21 and which plate 22 is dimensioned such that its outer edge projects outwardly beyond the ring 21. Advantageously, the outer metal plate 24 as shown in Fig. 2 is formed of a plurality of metal elements held in spaced relationship as shown at 75. In this manner, it is possible to make the outer diameter of the annular rubber spring 23 somewhat larger than the inner diameter of the ring 21 so that in its assembled position the spring 23 exerts a radial expansion force. Thus, the mating surfaces of the rubber body 23 and the metal plates 24 are subject to the axial forces exerted by the rubber body 23 and the shearing forces which were present in the prior structures, since they did not provide for radial expansion, are substantially eliminated. In this manner the operating life of the rubber spring is increased. The inner metal plate 25 is of unitary structure and includes an upper flange 27 which is screwed to the base plate 3, whereby the screening drum 2 is held axially positioned relatively to the drum shaft 15, 16.

Arranged in the hollow of the supporting shaft 14 is an eccentrically actuated pitman 29. The associated eccentric shaft 30 is rotatably journaled between two bearings 31 and 32 mounted on the center post. The pitman head 33 with its bearing 74 is, as shown in Figs. 3 and 4, constructed as an individual unit and is pivotally connected to the pitman 29 by a bolt 35 which is disposed transversely to the longitudinal axis of the eccentric shaft 30. The pitman 29 and the eccentric shaft 30 are thereby substantially universally movable relatively to each other.

On the upper end of the pitman 29 is a movable roller bearing as for instance a pendulum roller bearing 37 the inner race of which is fast on the push rod 29 by a nut 38. The outer race of the self aligning bearing 37 is disposed in a housing 36 on the top of which there is seated a spring plate 40. The spring plate 40 carries a centrally disposed projection 41 which extends through an enlarged formed opening in the flange 5. On the upper end of pin 41 there is fastened by a conically domed nut 43 a second spring plate 44. Disposed between the spring plate 40 and 44 are two annular rubber buffers 45 and 46 which compressively engage the flange 5 disposed therebetween. In this manner the pitman 29 is resiliently connected to the screening drum 1 since both of the rubber buffers 45 and 46 are loosely coupled between the pitman 29 and the screening drum 1. It is evident, therefore, that the pitman 29 may be inclined in any direction and is capable of following the pendulum movement of the screening drum 2, since the pitman 29 is supported at its upper end by the pendulum roller bearing 37 and at its lower end by the universal joint arrangement above described. By this structure there is prevented the end thrust on the roller bearing which is usually present in the absence of the above described structure.

The screening drum 1 is encircled by a stationary tank 51 of which the outer wall is at its upper end slightly conically shaped and the upper edge terminates below the top edge of the screening drum 2. At the top edge of the screening drum 1 there is formed a laterally extending flange 53 and an inclined flange 54 which extends into and is parallel with the wall of the tank 51. In this manner water is prevented from being discharged from the tank 51. The inner wall 47 of the tank 51 terminates below the annular plate 22 and is at this location provided with an annular plate 49. The space 48 between the adjacent surfaces of the annular rings 22 and 49 is arranged such that there is sufficient clearance therebetween to permit rotation of the drum shaft. Also with this arrangement there is provided an adequate juncture for preventing the water from being discharged from the tank 51 at this point.

The tank 51 is provided in its bottom wall with a water outlet 73 and an axially arranged intermediate wall 55 which rests on the machine base 13, which base 13 is joined by ribs 56 to spaced outer frame wall 57 forming therebetween a compartment 67. Adjacent the lower edge of the wall 57 there are fastened a plurality of lugs 58 which rest on vibration dampening members 59 supported on a bunker 60. On a platform 61 attached to the wall 57 there is carried a motor 62 which by means of a plurality of belts 63 is connected to the pulley 20. On the opposite side of the wall 57 there is provided a second platform 64 on which there is mounted a second motor 65 which by means of a belt drive 66, a shaft 68, and a resilient coupling 69 is operative to drive the eccentric shaft 30. The frame wall 57 is covered by a lid 70 having a central opening 71 supporting a pipe 72 of which the lower end extends into the truncated cone 8. The pipe 72 serves as an inlet for introducing the slurry to be separated into the centrifuge.

The drum shaft section 15, 16 are operated by means of the motor 62 and thereby the screening drum 1 at a rate of approximately 800 r.p.m. such that there is created a centrifugal force approximately 140 times greater than the force of gravity. At the same time the eccentric shaft 30 is actuated by the motor 65 to oscillate the pitman 29 through its universal coupling at a rate of approximately 30 vibrations per minute with an amplitude of approximately 2 mm.

To separate the fluid from the particles as for example a crushed coal sludge in which the coal particles measure from approximately 0 to 2 mm., the sludge is introduced into the centrifuge through the pipe 72 whereupon it drops on the conical head of the cap nut 43 and thence upon the spring plates 44. From the plate 44 the sludge is thrown on to the surface of cone 8 which is being vertically oscillated. Because of the oscillating movement and also because the cone 8 tapers to a greater width at its lower end, the sludge is cast therefrom in the direction of rotation of the drum shaft.

After its discharge from the cone 8 the sludge is received within the screening drum 2 wherein it travels from the bottom thereof on to the screening surface 2 and the influence of the oscillating motion, toward the top and is thereby separated from the water, the coal particles being discharged across the top flange 53 whereupon they fall through the compartment 67 into the bunker 60. The water which is discharged through the screening drum is entrapped in the tank 51 and discharged from the latter through the outlet 73.

The annular shaped rubber springs 23, 24, 25 as shown in Fig. 2 are formed with an extremely large diameter and serve to maintain the screening drum 2 in a high degree of stability against lateral pendulum movement which exists when for example there is a fluctuation in the quantity of particles being separated. The fluctuation causes the drum shaft to become unbalanced. It follows, therefore, that the cross sectional thickness of the annularly shaped rubber members be selected such as to have a natural frequency greater than operation oscillation frequency thereby to create a stability against pendulum movement of the screening drum 1.

In place of the annular rubber springs there may be substituted three or more separate springs which also may be formed of a rubber body having metal plates vulcanized on their inner and outer surfaces. The separate springs are symmetrically arranged on the drum shaft and the outer metal plates secured on the collar 19 and the inner metal plates on the bottom plate 3. The metal plates secured on the springs may be of varied contours, as for example triangular. The separate springs may also be formed of arcuately curved metal plates which may be fastened to the concentric ring 21. Advantageously, the belts 63 extending through the space 67 are provided with a cover to protect them from the particles falling through the compartment 67.

The relationship of the water tank 51 and the ring space 67 is merely schematically illustrated. Without further details, it is obvious that the diameter of the tank 51 and space may be made smaller than illustrated thereby to reduce the overall diameter of the centrifuge. Also, it is possible to increase the space between the top edge of drum 2 and the cover 70 thereby to improve the discharge of the particles from the screening drum 1 into the compartment 67.

What I claim is:

1. A centrifuge for separating water from fine granular material comprising a hollow center post, a screening drum shaft rotatably journaled on said post, a screening drum having a screening surface and an annular base plate, resilient means securing said screening drum to said screening drum shaft including an annular ring member of compressible plastic material having outer and inner periphery surfaces, said outer periphery surface secured to said screening drum shaft, a metallic ring member secured to said inner periphery surface, said screening drum base plate secured to said metallic ring member, reciprocating means in said hollow center post, means connecting said reciprocating means to said screening drum including a loose coupling, said loose coupling means comprising an upwardly extending sleeve formed on the inner edge of said annular base plate, an inwardly projecting flange on the upper edge of said sleeve, resilient buffers of compressible plastic material located above and below said flange, and means holding said resilient buffers in compressive engagement with said flange.

2. A device as claimed in claim 1 having a vertically oscillating cone supported from said flange actuated by said reciprocating means and a feed means to introduce a slurry into said cone.

3. A device as claimed in claim 1, the annular rubber ring members having a cross sectional thickness sufficient to give to said members a natural frequency greater than the operational reciprocating frequency of the reciprocating means.

4. A device as set forth in claim 1, said means connecting said reciprocating means to said screening drum including a bearing.

5. A device as set forth in claim 1, wherein said screening drum shaft includes a concentric metal collar secured to said outer periphery surface of said resilient means for rotation with said screening drum shaft and rotation of said resilient member.

6. The invention as defined in claim 5 in which said collar is provided with a belt pulley.

References Cited in the file of this patent

UNITED STATES PATENTS

| | | |
|---|---|---|
| 2,437,651 | Rasmussen | Mar. 9, 1948 |
| 2,463,801 | Page | Mar. 8, 1949 |
| 2,781,130 | Heckmann et al. | Feb. 12, 1957 |
| 2,793,757 | McWethy | May 28, 1957 |